United States Patent [19]

Holloway et al.

[11] 4,207,914

[45] Jun. 17, 1980

[54] FLUID RELAY APPARATUS

[75] Inventors: Thomas M. Holloway, Mukwonago; George J. Janu, Brookfield; Richard N. Laakaniemi, Milwaukee; Warren A. Lederman, Wauwatosa, all of Wis.

[73] Assignee: Johnson Controls, Inc., Milwaukee, Wis.

[21] Appl. No.: 964,068

[22] Filed: Nov. 27, 1978

Related U.S. Application Data

[63] Continuation of Ser. No. 763,863, Jan. 31, 1977, abandoned.

[51] Int. Cl.[2] .......................... G05D 16/00; F15B 5/00

[52] U.S. Cl. ................................ 137/85; 137/596.18; 251/61.1

[58] Field of Search ................ 137/82, 84, 85, 596.18, 137/627.5; 251/61.1

[56] References Cited

U.S. PATENT DOCUMENTS 2,974,674 3/1961 Baldridge .............................. 137/85

3,856,046 12/1974 Brown ........................... 251/61.1 X

FOREIGN PATENT DOCUMENTS 1917079 10/1961 Fed. Rep. of Germany ............ 137/85

*Primary Examiner*—Alan Cohan

*Attorney, Agent, or Firm*—Andrus, Sceales, Starke & Sawall

[57] ABSTRACT

A control valve includes a single diaphragm as a common wall between an input signal chamber having an input port and an output chamber having a central supply port and an exhaust orifice. The orifice has a seating face parallel to and spaced from the diaphragm. A spring-loaded ball valve unit in the supply passage is aligned with an operator moving with the diaphragm. An increasing input signal first moves the diaphragm to close the exhaust orifice and thereafter moves the operator to open the supply valve. Pressure builds in the output chamber, tending to return the diaphragm and close the supply valve until the output and pilot pressure are balanced. The supply valve then closes. As the exhaust is sealed off, this effectively seals the output chamber. If the signal decreases, the diaphragm uncovers the exhaust orifice until a new balanced state is created. In high flow capacity systems a multiplicity of exhaust orifices are employed to match exhaust and supply flow capacity while maintaining minimal leakage.

15 Claims, 5 Drawing Figures

FLUID RELAY APPARATUS

This application is a continuation of application Ser. No. 763,863 filed Jan. 31, 1977, now abandoned.

BACKGROUND OF THE INVENTION

This invention relates to a fluid relay apparatus and particularly to a diaphragm-type relay apparatus for controlling one fluid signal from another fluid signal.

In fluid control and operating system, a relatively small fluid control signal controlling a relatively large fluid control or operating signal may be advantageously employed within the system. Fluid relays may be employed as a volume and/or pressure amplifier in which a first fluid pilot signal controls a fluid output signal. In volume amplifiers, a large output fluid volume may be controlled within a given operating pressure range by a small pilot signal. In other applications in which pressure amplification is desired the low pressure pilot signal controls a high pressure output signal. In both applications, either direct or reverse acting response may be required. In typical pneumatic relay device, a multiple diaphragm assembly includes a pilot diaphragm defining a common wall between a pilot chamber and an exhaust chamber. A supply diaphragm forms an opposite wall of the exhaust chamber and a wall of an output chamber. A supply chamber is coupled or extended from the output chamber and interconnected thereto by a suitable spring-loaded valve assembly. A valve assembly also interconnects the exhaust chamber to the output chamber with the exhaust valve seated on the supply valve assembly. In operation, increasing pilot pressure functions to first close the exhaust assembly to the output valve assembly. Further increases in pilot pressure function through the exhaust valve assembly to open the supply valve assembly and connect supply pressure and flow to the output chamber, and therefore to the load or output line. Pressure then increases within the output chamber until balanced by the pilot pressure and a stable output condition is created. If the relay is connected to a dead-ended load, the supply valve closes and the exhaust valve remains closed against the supply valve assembly to hold the pressure just equal to the pilot pressure. Decreasing the pilot pressure first causes the exhaust valve assembly to move from the supply valve for exhausting of air until such time as the equilibrium pressure condition is again established. Increasing of pilot pressure from that position would, of course, again open the supply valve assembly and reestablish an equivalent condition.

Although various modifications of this system are employed, they generally include the separate exhaust chamber having a separate diaphragm connected to control fluid exhaust either through the inter-related cascaded exhaust-supply valve assembly or a separate valved connection in the output system. The spring forces and interrelated fluid forces acting over the various diaphragms in the conventional construction introduce deviations in the system response. Generally, the relays have a significant hysterisis level in the presence of increasing and decreasing input signals. In addition, depending upon the care and special procedure of construction, commercially-produced devices also may have significant deviations from an ideal linear characteristic. For example, a fluid repeater or one to one booster relay desirably has an essentially straight line characteristic with a 1:1 ratio between the input and output pressures and minimal offset, linearity, and hysteresis. Such characteristics might generally be obtained with careful construction and design, but generally require relatively complex and costly apparatus.

There is a need for a relatively simple, and inexpensive booster fluid relay which produces a highly accurate output with minimal offset, hysteresis and deviation from linearity.

SUMMARY OF THE PRESENT INVENTION

The present invention is particularly directed to a fluid control apparatus employing a common diaphragm unit responsive to the input pressure and the output pressure, in combination with a separate exhaust means controlled by such common diaphragm and a separate supply valve assembly controlled by such common diaphragm. Thus, generally in accordance with present invention, the exhaust valve seat assembly and the supply valve seat assembly are separately provided and mounted as a part of an output chamber means. The single or common diaphragm unit is constructed to directly control the sealing of the exhaust valve means and to directly and separately control the supply valve means. A relatively soft spring assembly or other similar means biases the supply valve assembly to the closed portion in contrast to rather stiff supply valve spring required in a conventional design. The use of the separate valving systems with the single diaphragm has been found to significantly minimize the hysteresis effect. High flow capacity and rapid speed of response can be provided with the common diaphragm control of the exhaust and the supply.

More particularly, in one preferred and unique embodiment of the present invention, a single diaphragm defines a common wall between an input signal chamber and output chamber. An exhaust orifice is formed within the output chamber having a seating face parallel to and spaced from the diaphragm. The supply valve assembly is mounted within an inlet passageway terminating in the output chamber which also has a load connecting passageway. An operator for opening the valve assembly moves with the diaphragm for opening of the valve assembly. In operation, an increasing input signal first moves the diaphragm to close the exhaust orifice and prevent output air from exhausting from the output chamber. With the exhaust sealed, remaining input pressure signal or force is transmitted to the operator of the inlet or supply valve assembly to positively open the valve mechanism and allow supply air to flow into the output chamber. The output pressure builds within the output chamber and in so doing tends to return the diaphragm and close the supply valve assembly until the output pressure equals the pilot pressure. When the balanced condition is created, the supply valve assembly is closed. As the exhaust is sealed off, this effectively seals the output chamber. In a highly practical pressure system, the inlet or supply valve assembly includes a soft, resilient ball with a soft spring forcing the ball onto a valve seat to close the supply passageway. The spring can be a relatively light or soft spring which is only sufficient to hold the ball in a closed position with the supply pressure removed. The supply pressure also exerts a force against the ball. The sealing force against the ball decreases with increasing output pressure due to the reduced pressure differential across the ball. The control plunger is acted upon by the diaphragm and is movable into engagement with the ball and is operative to move the ball from the valve seat with appropriate compressing of the soft spring.

In certain applications where high flow capacity is desired, a relatively large supply valve area can be readily provided. This supply capacity must, of course, be balanced by the exhaust system. However, to balance the exhaust capacity with the output and the full flow capacity, a single exhaust orifice would generally be so large as to interfere with effective sealing of such orifice by the diaphragm. The inventor has found that a multiplicity of exhaust ports or orifices can, however, advantageously be employed to match exhaust flow capacity to supply and output capacity while maintaining minimal leakage even when large capacity is specified. Of course, leakage is greater than with a single orifice. The use of a multiplicity of orifices or a large orifice slightly decreases the operative area of the diaphragm in the output chamber. With a multiple exhaust orifice device, offset between the pilot pressure and the output pressure increases and thus the characteristic is not as optimum as in the low capacity system.

The present invention thus provides a simple and practical construction of a fluid apparatus and particularly a one to one booster relay having good linearity, minimal offset, hysteresis effect and the like while permitting large flow capacity and improved system response.

BRIEF DESCRIPTION OF DRAWINGS

The drawings furnished herewith illustrate a preferred construction of the present invention in which the above advantages and features are clearly disclosed as well as others which will be readily understood from the following description.

In the drawing.

DESCRIPTION OF THE ILLUSTRATED EMBODIMENT

Figure 1:
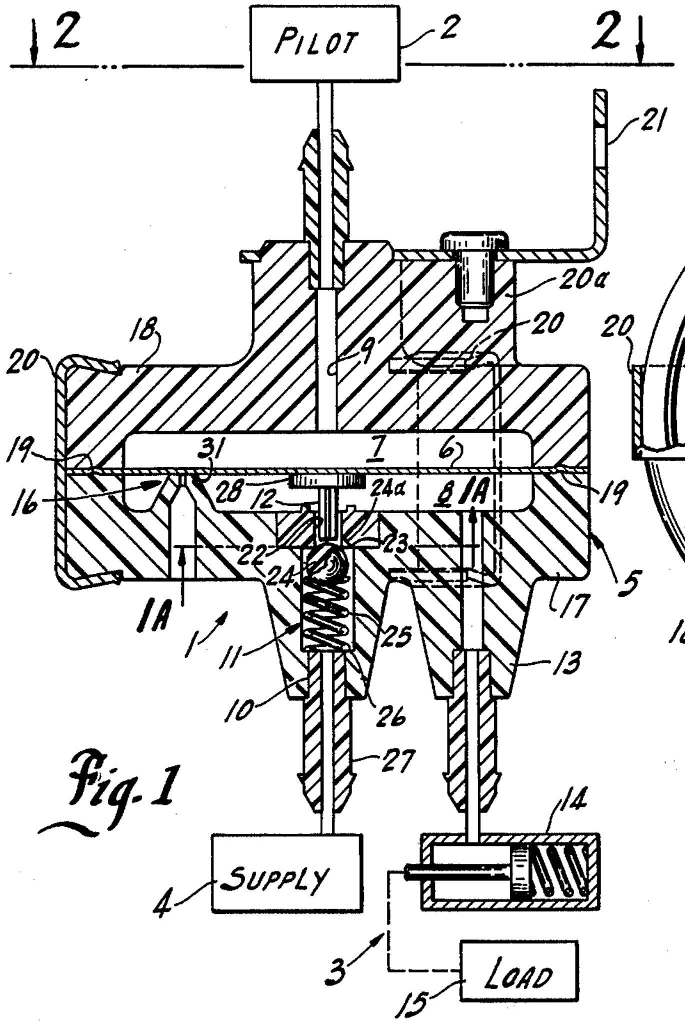
FIG. 1 is a cross-sectional view through a one-to-one booster relay constructed in accordance with the invention.
Figure 2:
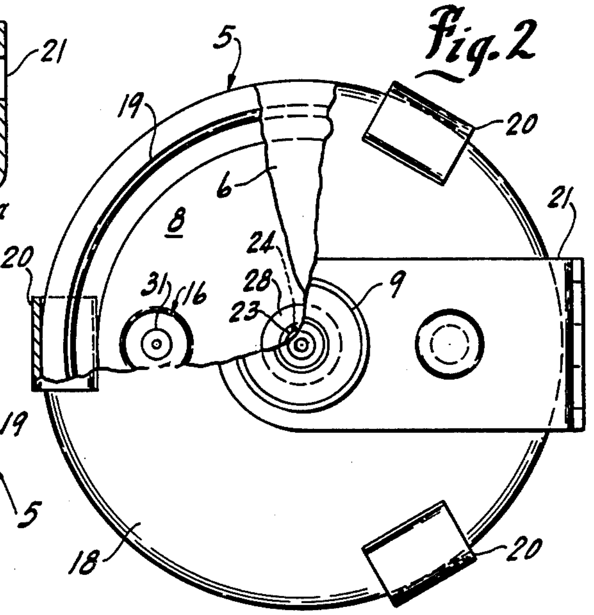
FIG. 2 is a top view of the relay apparatus of FIG. 1 with parts broken away and sectioned.

Referring to the drawing and particularly to FIGS. 1 and 2, the present invention is shown in a one to one booster relay unit 1 connected to a fluid pressure pilot signal source 2 and coupling a load 3 to a fluid pressure operating source 4. The relay unit 1 includes an outer housing 5 within which a single diaphragm 6 is located with a pilot chamber 7 to one side of the diaphragm and a combined exhaust and output chamber 8 to the opposite side of the diaphragm. An inlet port or passageway 9 is provided to the pilot chamber for introducing the signal pressure of source 2. A supply input port or passageway 10 is connected to the output chamber 8 and to the pressurized supply or source 4. Sources 2 and 4 may be any suitable or well known unit such as pneumatic source suitable for operating of the load 3. The supply passageway 10 includes a check valve assembly 11 to selectively close the connection to the output chamber 8. An operator 12 is acted upon by the diaphragm 6 and positively opens the check valve assembly 11 for introducing air into the chamber 8 as the diaphragm moves under the pilot signal pressure. An output passageway or port 13 connects the output chamber 8 to the load unit 3 shown as dead-ended piston operator 14 having the piston rod coupled to position a mechanical load such as a damper 15. An exhaust port 16 is also provided in the output chamber 8 and is selectively opened and closed by the diaphragm 6 in response to the pilot or signal pressure in chamber 7 and in conjunction with the diaphragm actuation of the supply valve assembly 11 establishes and maintains pressure in the output chamber 8 equal to the pilot pressure in chamber 7. The load 3 is therefore operated at essentially the pilot pressure. The relay 1 permits control of a large volume of operating air with a small volume of signal air and, of course, isolates the two systems. The use of the single diaphragm acting independently but co-jointly on the separate exhaust system passageway and the separate supply valve assembly provides a simple, reliable one-to-one booster relay having minimal offset deviating from the ideal straight line characteristic shown in FIG. 3 in terms of hysteresis effect and linearity. Further, if the load unit 3 consumes air, the relay apparatus may readily control a large flow from a suitable source 4 with essentially instantaneous system response.

More particularly, in the illustrated embodiment of the invention, the outer housing 5 is a two-piece housing including a bottom cup-shaped wall 17 within which the output chamber 8 and respective supply and output ports 10 and 13 are formed, and an inverted cup-shaped wall 18 within which pilot chamber 7 and pilot port 9 are formed. The diaphragm 6 is any suitable flexible diaphragm material and is shaped with the peripheral portion located and clamped between the opposed outer flanges of the two walls 17 and 18. The one flange is provided with a suitable annular projection 19 to form a fluid tight joint upon firm interconnecting of the walls 17 and 18, shown connected by suitable clamping clips 20.

The pilot port 9 is formed generally centrally of the upper wall 18 and includes an outer mounting hub portion 20*a*. A mounting bracket 21 is secured to the upper wall 19 with a portion overlying the hub portion for mounting of the relay apparatus upon a suitable support, not shown.

The pilot chamber 7 and the exhaust output chamber 8 are essentially identical in diameter and thus the pressures therein act upon identical areas of diaphragm 6. As more fully described hereinafter, the output pressure in chamber 8 equals the pilot pressure in chamber 7.

The bottom wall 17 is provided with the supply passageway or port 10 located centrally of the chamber 8. The port 10 is connected to an insert in the base of the chamber with a central passage 22, the lower end of which defines a valve seat 23. A check ball 24 which is formed of a suitable rubber-like material is located within passageway 22 and is urged into engagement with the valve seat by a coil spring 25 acting between the backside of the ball 24 and a suitable outer ledge 26, shown as the inner surface of a supply connecter 27. The spring 25 resiliently urges the ball 24 into sealing engagement with the valve seat 23 to close the passageway 22 and effectively disconnect the source 4 from the chamber 8.

Figure 3:
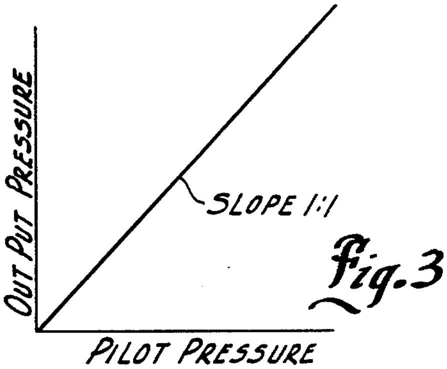
FIG. 3 is a diagrammatical graphical illustration of the input signal pressure versus the output pressure for a relay shown in FIGS. 1 and 2.
Figure 1A:
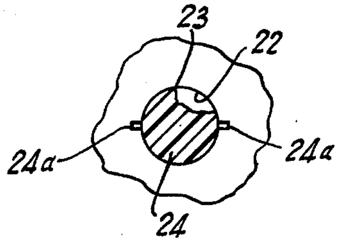
FIG. 1*a* is a fragmentary view on line 1*a*—1*a* of FIG. 1.

For optimum steady state operation, a small by-pass may be provided from the supply to the output chamber 8. A practical construction includes a small passageway 24*a* in the nature of scratch in the corner of the seat 24 providing a minute flow past the seated ball 2. The passageway 24a avoids hysteresis of the pressure characteristics such as shown in FIG. 3.

In practical commercial production, the exhaust port 16 generally includes some leakage as a result of the forming of the port seat. This leakage tends to create an affect in the pressure characteristics. This offset may be avoided by increasing the size of leakage passageway 24a sufficiently to provide for such exhaust leakage in addition to the hysteresis leakage and thereby maintain the true 1 to 1 characteristic shown in FIG. 3.

The spring 25 may be and preferably is a relatively soft spring to minimize hysteresis of the unit.

A plunger or valve operator 12 is acted upon by the center of the diaphragm 6 in any suitable manner in alignment with the passageway 22 and extends through chamber 8 and passageway 22 into operative engagement with the valve assembly 11. The illustrated plunger 12 has a head 8 abutting the diaphragm and a relatively narrow stem 47 which projects downwardly through the passageway 22 into engagement with the valve ball 24. The stem is formed with a square or suitable cross-section so as to allow maximum supply flow around the plunger but whose edges guide the plunger. The base wall of the output chamber 8 is provided with a recess or has posts which serve as stops adjacent passageway 22 to accomodate the unobstructed inward movement of the head 28 as the pilot pressure in chamber 7 increases and deflects the diaphragm 6 and the plunger 12 inwardly.

The exhaust passageway or port 16 is formed in the wall 17 projecting into the output chamber as a nozzle-like member terminating in a relatively flat sealing face 31 in close parallel relation to the diaphragm 6. The exhaust port 16 is generally located to one side of the supply passageway 22 and may be advantageously located to the opposite side from the output port 13. The valve seat defined by the flat face 31 is closely spaced to the diaphragm 6 in the unloaded or non-pressurized state. Slight movement of the diaphragm 6 is required to effectively open and close the exhaust port 16.

In the operation of the illustrated embodiment of the invention, the signal or pilot pressure is applied to the pilot chamber 7 and acts over the total exposed area of the diaphragm 6. Increasing pilot pressure causes the diaphragm 6 to first move into engagement with the exhaust passageway seat 31 and thereby close the exhaust port 16. This essentially seals chamber 8 and prevents escape of air from the output chamber 8 to atmosphere, other than for the leakage conditions previously discussed. The exhaust port 16 is completely and independently sealed prior to any effective movement of the input or supply valve assembly 11 such that the exhaust closure is essentially independent of response of the supply valve assembly. Any further input force is transmitted to the affixed plunger 12 which moves into engagement with the check ball 24 of assembly 11 and then moves the ball from valve seat 23. The supply passageway 22 is correspondingly opened and supply air flows into the output chamber 8 and through the output port 13 and interconnecting line to the load device 3. With a deadened load as shown, the output pressure rapidly builds in the output chamber 8 and connecting lines until the pressure equals the pilot pressure. At this point, a balanced condition is created across diaphragm 6 which is repositioned to a neutral position. The valve ball 24 again moves into engagement with the valve seat 23 as a result of the balanced pressure on diaphragm 6 and the loading of spring 22. The ball is also held closed by the pressure differential between the supply and output pressures acting across the ball. The pilot and output pressures act essentially over the same diaphragm area and produce a one to one pressure ratio. The only differential area is that created by the small area of the exhaust port 16. As this area may be made quite small, offset pressure is essentially and practically insignificant.

If the pilot pressure increases, the diaphragm 6 and the attached plunger 12 moves downwardly, opening the supply valve assembly 11 until a new balance pressure is created at which time the output pressure equals the input or signal pressure.

When the pilot pressure is decreased, the output force on the diaphragm moves the diaphragm away from the exhaust valve seat 31. The valve assembly 11 remains closed and the air exhausts from the output chamber 8 with a corresponding decrease in pressure. This continues until a new equilibrium condition is again established, at which time the diaphragm 6 again has moved into a sealing engagement with the exhaust valve face 31. The output pressure is now reduced and essentially equals the reduced pilot pressure.

The illustrated embodiment of the invention develops an essentially accurate one to one relationship between the output and pilot pressures over the normal operating range. The use of the common diaphragm insures that response and operating characteristics of the pilot and output pressures are essentially the same.

The ratio of the exhaust valve area to the diaphragm effective area is very small and maintains a practical one to one pressure relationship. Hysteresis in the relay response is also significantly minimized as a result of the elimination of all heavy or large spring forces. A relatively soft spring in contrast to the more conventional stiff supply valve spring may be employed as the exhaust valve 16 is separate and does not load the supply valve assembly. This minimizes the required starting response pressure and the resultant hysteresis characteristic associated with the unseating of the exhaust valve unit. In a conventional system the pilot pressure must be lowered some slight amount before the exhaust valve unseats and thus inherently generates a resultant hysteresis in the switching action. In this invention, as the pilot pressure decreases, the diaphragm rapidly responds to open the exhaust port. The diaphragm also provides improved sealing capability such that a low leakage steady-state flow and consumption occurs during system operation. The illustrated embodiment of the invention thus permits relatively high flow rate with the rapid speed of response.

Figure 4:
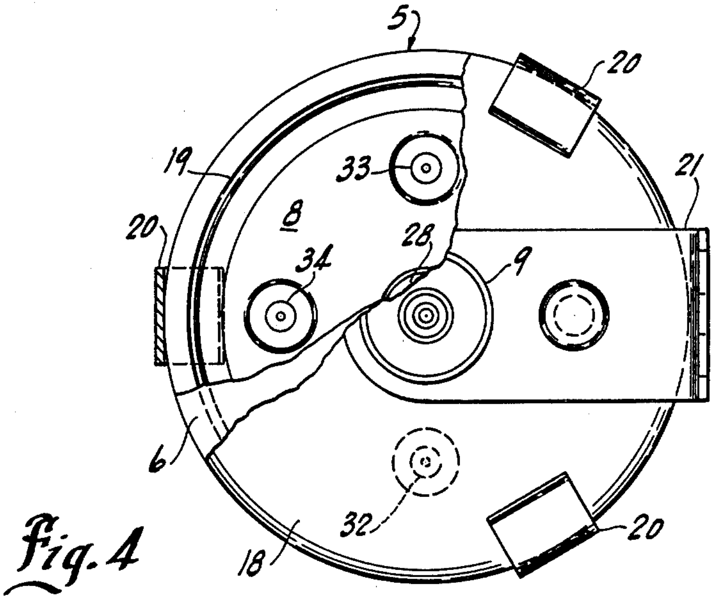
FIG. 4 is a view similar to FIG. 2 of a further embodiment of the present invention.

In applications requiring even higher flow capacity, a larger supply valve area can be provided. However, in order to maintain a balance between exhaust and output flow capacities, the area of the exhaust passageway must also be increased. The exhaust port cross-section technically can, of course, be appropriately increased in size. However, the sealing area of the diaphragm increases by the same area and the effective operating area decreases. There are therefore practical limitations on increasing of the exhaust port diameter. The inventor has found that increased exhaust capacity may be provided by providing a plurality of small exhaust ports, such as shown in the embodiment of FIG. 4. This second embodiment is essentially of the same construction as that of FIG. 1 and only the changes are described in the embodiment of FIG. 4, three individual exhaust ports, 32, 33 and 34 are distributed in spaced relation about the supply passageway 12. The exhaust ports 32–34 essentially correspond to that previously described and are shown spaced by ninety degrees over the half of the output chamber 8. The diaphragm 6 maintains effective sealing with low leakage. The diaphragm effectively and simultaneously seals and opens all of the ports 32–34 to provide the desired flow characteristic and particularly increased flow capacity.

The total effective area of the diaphragm 6 within the output chamber 8 is, however, slightly reduced by the area of the two additional ports. The particular offset between the pilot and output pressure is slightly more pronounced than with the single orifice area. However, the modified construction does provide an effective response with low leakage where slight offset is acceptable.

Various modes of carrying out the invention are contemplated as being within the scope of the following claims, particularly pointing out and distinctly claiming the subject matter which is regarded as the invention.

We claim:

1. A fluid relay device, comprising a body assembly, a control flexible diaphragm of a flexible material permitting relative movement between various portions thereof with flexing of the diaphragm therebetween, said diaphragm being secured within the body assembly and defining an input signal chamber to one side of the diaphragm and a combined exhaust and output chamber to the opposite side of the diaphragm, said diaphragm moving to a position to balance the pressure in said chambers, a valved supply means connected to said output chamber and having an essentially rigid control means coupled to a first portion of diaphragm and moving with the diaphragm for opening and closing of said supply means in response to movement of said diaphragm, and an exhaust port means connected to said output chamber in spaced relation to the supply means including said rigid control means and having a seal means located in opposed relation to a closure portion of the diaphragm and opened and closed by the movement of said diaphragm, and said rigid control means and said first portion being spaced from said closure portion and connected to said closure portion solely by a non-rigid connection provided only by said diaphragm whereby said first portion and control means includes movement relative to the said closure portion including with the closure portion stationary.

2. In a fluid relay apparatus, comprising a body assembly, a control flexible diaphragm secured within the body assembly with a fluid tight peripheral connection and defining an input signal chamber to one side of the diaphragm and a combined exhaust and output chamber to the opposite side of the diaphragm, a supply passageway connected to said output chamber, a valve assembly in said supply passageway, an operator means connected to and moveable with a first portion of the diaphragm for opening and closing of said valve assembly in response to movement of said diaphragm, and an exhaust port means connected to said output chamber in spaced relation to the valved passageway, said port means having an exhaust seat located in close spacement to an aligned closure portion of said diaphragm for opening and closing of the port means by the movement of the aligned closure portion of said diaphragm, said diaphragm being formed of a flexible material permitting the closure portion to move with the first portion stationary, said aligned closure portion being spaced from said operator means and said first portion and connected solely by a non-rigid connection to the first portion provided only by said flexible diaphragm whereby said closure portion includes independent movement relative to the operator means and said first portion with a flexing of the diaphragm between the first portion and the closure portion.

3. In the fluid relay apparatus of claim 2, wherein said exhaust port means includes a small level of uncontrolled leakage, and said supply valve assembly including a leakage passageway to create a small uncontrolled leakage level in excess of the first named uncontrolled leakage level and thereby elimination offset of the pressure characteristic with the supply valve in the cutoff position.

4. In the fluid relay apparatus of claim 3 wherein said supply passageway includes an opening terminating in a circular seat, a check valve ball seated on said circular seat, and said leakage passageway is formed as a small passageway in said circular seat.

5. The relay apparatus of claim 2 wherein said supply passageway is located centrally of said output chamber, an output port connected to said output chamber, said exhaust port and output port being located on opposite sides of said supply passageway.

6. In the apparatus of claim 2 wherein said exhaust port means includes a plurality of spaced, exhaust ports spaced about the supply passageway to increase the exhaust capacity of said apparatus.

7. In the apparatus of claim 2 wherein said exhaust port means includes a nozzle member projecting into the output chamber toward the diaphragm and terminates in a flat sealing face in close spaced relation to the diaphragm.

8. The relay device of claim 2 wherein said body assembly includes a pair of opposed generally cup-shaped housing members having corresponding flanges, said diaphragm is interposed between said members and sealed at said flanges to define said input chamber and said exhaust and output chamber.

9. The relay device of claim 2 wherein said supply passageway is coaxially located of said output chamber, said supply passageway having an intermediate reduced portion and an enlarged portion, said valve assembly including a check valve located within said enlarged portion and continuously, resiliently urged into seating engagement with said reduced portion, said operator means includes a plunger having a stem portion passing downwardly through said intermediate portion into engagement with said check valve.

10. The relay device of claim 9 wherein said plunger includes an attachment head projecting radially of said stem, and post means in the output chamber in alignment with said head and defining stops limiting the movement of the plunger.

11. The relay apparatus of claim 2 wherein said exhaust port means includes a plurality of exhaust leak ports extending into said output chamber and terminating in a generally flat face in slightly spaced relation to the unstressed control diaphragm, said ports being spaced about the supply passageway, and an output port connected to said output chamber in spaced relation to said exhaust leak ports and to said supply port.

12. The fluid relay apparatus of claim 2 having a body portion including a housing, said diaphragm secured within said housing, a spring-loaded check valve unit located within said supply passageway and continuously, resiliently urged into sealing position, said operator means including a plunger operator in alignment with said valve unit and having a head portion coupled to said diaphragm, said port means including an exhaust leak port extending into said output chamber and terminating in a generally flat face in slightly spaced relation to the unstressed diaphragm, said exhaust leak port being spaced radially outwardly of said supply passageway means and said head portion and inwardly of the outer periphery of the output chamber.

13. In the fluid relay apparatus of claim 12 wherein said supply passageway includes a stepped construction defining a valve seat, said valve unit including a soft resilient ball urged into engagement with said valve seat, said plunger extending through the passageway into engagement with said ball.

14. The fluid relay apparatus of claim 13 wherein said plunger operator includes an enlarged head secured to said diaphragm, said supply passageway including a reduced portion adjacent the output chamber and an enlarged coupling up portion, and stop means adjacent the supply passageway and in alignment with said head.

15. The fluid relay apparatus of claim 14 including a plurality of said exhaust ports circumferentially spaced about the supply passageway in spaced relation to each other and to said output port.

* * * * *